(12) United States Patent
Rodgers (10) Patent No.: US 8,307,557 B1
(45) Date of Patent: Nov. 13, 2012

(54) FOOT OPERATED CUTTER

(76) Inventor: Timothy J. Rodgers, St. Louis, MO (US)

( * ) Notice: Subject to any disclaimer, the term of this patent is extended or adjusted under 35 U.S.C. 154(b) by 346 days.

(21) Appl. No.: 12/631,978

(22) Filed: Dec. 7, 2009

Related U.S. Application Data (60) Provisional application No. 61/193,708, filed on Dec. 17, 2008.

(51) Int. Cl.
*B26B 17/00* (2006.01)
*B26B 17/02* (2006.01)
*B26B 13/00* (2006.01)

(52) U.S. Cl. .............. 30/187; 30/227; 30/242; 30/341

(58) Field of Classification Search ............ 30/186–192, 30/227, 228, 237, 242, 250, 251, 341
See application file for complete search history.

(56) References Cited

U.S. PATENT DOCUMENTS

| | | | | |
|---|---|---|---|---|
| 500,184 A * | 6/1893 | Beers | | 30/187 |
| 727,610 A * | 5/1903 | Galloway, Jr. | | 30/187 |
| 728,068 A * | 5/1903 | Young | | 30/228 |
| 1,556,944 A | 10/1925 | Lopez | | |
| 1,592,017 A * | 7/1926 | Van Campen | | 30/187 |
| 2,086,863 A | 7/1937 | Geddes | | |
| 2,351,406 A | 6/1944 | Dalley | | |
| 2,487,473 A | 11/1949 | Peterson | | |
| 2,542,384 A | 2/1951 | Altenpohl, Jr | | |
| 3,138,869 A * | 6/1964 | Parhaniemi | | 30/187 |
| 3,618,612 A * | 11/1971 | Ahn | | 30/190 |
| 3,893,237 A * | 7/1975 | Jahnke | | 30/187 |
| 4,028,971 A * | 6/1977 | Budrose | | 30/191 |
| 4,254,549 A * | 3/1981 | McMullin | | 30/251 |
| 4,663,847 A * | 5/1987 | Van Horn | | 30/187 |
| 5,058,272 A * | 10/1991 | Steube | | 30/134 |
| 5,715,604 A * | 2/1998 | Lanzoni | | 30/192 |
| 6,101,725 A * | 8/2000 | Linden | | 30/188 |
| 6,112,415 A | 9/2000 | Hagene et al. | | |
| 6,138,769 A | 10/2000 | Breyer | | |
| 6,202,310 B1 | 3/2001 | Linden | | |
| 6,230,598 B1 * | 5/2001 | Ressler | | 30/228 |
| 6,526,857 B1 | 3/2003 | Roush et al. | | |
| 6,754,961 B2 * | 6/2004 | Brockhage | | 30/251 |
| 6,966,114 B2 * | 11/2005 | Daniel et al. | | 30/188 |
| 7,322,111 B2 * | 1/2008 | Meador et al. | | 30/251 |
| 7,690,118 B2 * | 4/2010 | Yamakado | | 30/189 |
| 7,690,119 B1 * | 4/2010 | Weber | | 30/192 |
| 7,913,400 B2 * | 3/2011 | Larkin | | 30/187 |
| 7,966,734 B2 * | 6/2011 | Crain et al. | | 30/188 |
| 2008/0163494 A1 | 7/2008 | Larkin | | |
| 2009/0223055 A1 * | 9/2009 | Wendorf et al. | | 30/124 |
| 2010/0126025 A1 * | 5/2010 | Crockett et al. | | 30/188 |

FOREIGN PATENT DOCUMENTS

FR 2624691 A1 * 6/1989

* cited by examiner

*Primary Examiner* — Jason Daniel Prone
(74) *Attorney, Agent, or Firm* — Thomas A Gallagher (57) ABSTRACT

A foot operated cutter has an elongated handle with a pair of cutting jaws mounted on one end thereof and a gripping member at the other end thereof. The cutting jaws are mounted on separate spaced apart pivot axles. The upper end of each jaw is pivotally coupled to a movement arm and the two movement arms are pivotally coupled to each other. One movement arm is coupled to a foot operable lever. Movement of the lever causes the movement arms to pivot and move the upper ends of the jaws apart from each other resulting in the lower ends of the jaws coming together in a cutting action. A biasing member preferably urges the jaws to an open position. An adjustable stop is preferably provided and prevents the lever from putting too much force on the jaws.

13 Claims, 7 Drawing Sheets

FOOT OPERATED CUTTER

CROSS-REFERENCE TO RELATED APPLICATIONS

This application claims benefits from U.S. Provisional Patent Application No. 61/193,708, filed Dec. 17, 2008, the contents of which are hereby incorporated by reference herein.

BACKGROUND OF THE INVENTION

1. Field of the Invention

This invention relates broadly to cutting tools. More particularly, this invention relates to a foot operated cutting tool having an elongated handle.

2. State of the Art

A variety of lengths and configurations of rebar or reinforcing rods, often in the form of welded wire mesh, must be embedded within concrete structures when creating concrete foundations, walls, floors, columns, and other concrete building components. This typically requires shearing the rebar into pieces of the required dimensions for molding the concrete around the rebar. Welded wire mesh is typically provided in relatively large sheets, which are often so heavy and unwieldy that cutting and shearing the mesh must be done on the ground. This requires the user to bend down in order to cut the mesh using bolt cutters or the like. Constantly bending over in order to cut articles, such as the wire mesh, causes tremendous strain on the user's back and knees, which can lead to discomfort or serious injury.

SUMMARY OF THE INVENTION

A foot operated cutter according to the invention is particularly suited for cutting articles such as bolts or wielded wire mesh. According to a first embodiment, the foot operated cutter includes an elongated handle having opposed upper and lower ends that permits the user to cut the article without having to bend over or lower him or herself to the ground. Preferably, a gripping member is mounted at the upper end of the elongated handle.

A support member is attached to the lower end of the elongated handle and extends downward therefrom. A pair of (first and second) cutting jaws is pivotally attached to a lower end of the support member. First and second movement arms are pivotally attached to the upper ends of the first and second jaws and pivotally attached to each other. One of the movement arms is fixedly attached to a foot operated lever. Selective rotation of the lever causes the movement arms to pivot with respect to each other, which, in turn, causes the upper ends of each cutting jaw to rotate, since the upper ends of the cutting jaws are each pivotally attached to a respective one of the first and second movement arms. Rotation of the upper ends of the cutting jaws causes the lower ends to close, thus cutting an article placed therebetween.

A bias member having opposed first and second ends is provided. The bias member may be a helical spring or the like. Each of the first and second ends of the bias member are attached to a respective upper portion of one of the cutting jaws. The bias member biases the jaws to the open position.

According to a second embodiment, one of the movement arms (the one not attached to the lever) has a free end that acts as a stop and the lever is provided with a stopping surface. When the lever is depressed the free end rotates so that the stop faces the stopping surface and they eventually contact preventing further movement of the lever.

According to a third and presently preferred embodiment, the lever and the first movement arm are integrally formed and the stopping surface is adjustable. The stopping surface is embodied as a set screw in the lever and the location of the stopping surface is thus movable relative to the lever. Adjustment of the set screw determines the point in rotation at which further movement of the lever.

Additional objects and advantages of the invention will become apparent to those skilled in the art upon reference to the detailed description taken in conjunction with the provided figures.

DETAILED DESCRIPTION

FIGS. 1-4, illustrate a first embodiment of a foot operated bolt cutter 10. As shown best in FIG. 1, the bolt cutter 10 is a tool for cutting articles such as wire mesh M. The foot operated bolt cutter 10 includes an elongated handle 12 having opposed upper and lower ends 14, 16 (FIG. 2) respectively, which permits the user to cut the article without having to bend over or lower himself or herself to the ground. Preferably, a gripping member 18, such as, in this embodiment, a D-shaped handle, is mounted at the upper end 14 of the elongated handle 12. It should be understood that the particular configuration and size of gripping member 18 may be varied for comfortable use by a wide variety of users. Similarly, the dimensions of elongated handle 12 may be varied for users having varying heights. Gripping member 18 may be formed from plastic or any other suitable, comfortable material. Similarly, elongated handle 12 may be formed from any desired material, such as metal, wood or the like. A telescoping handle may be provided to accommodate a wide number of users with a single apparatus.

Figure 1:
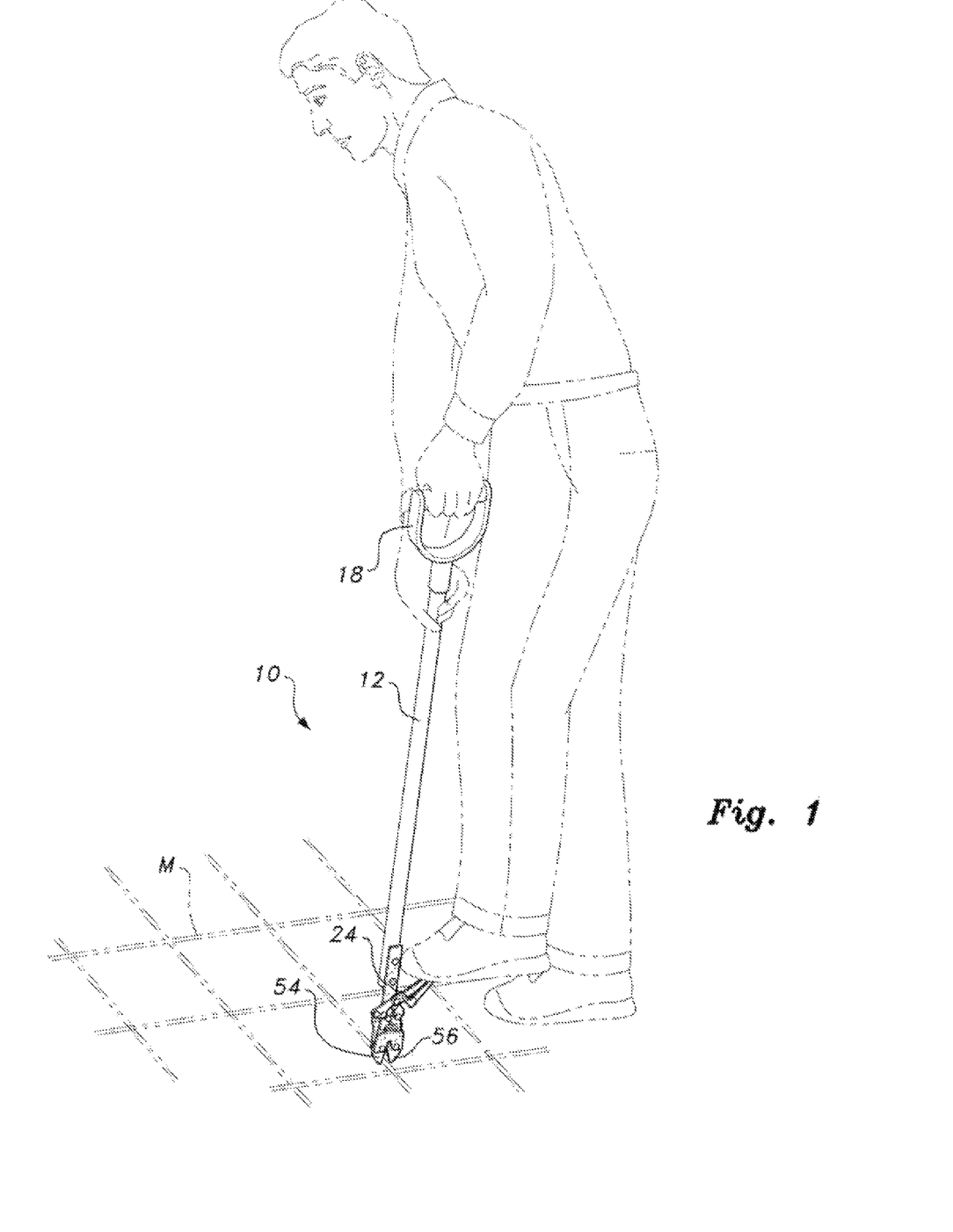
FIG. 1 is an environmental, perspective view of an exemplary embodiment of a foot operated cutter according to a first embodiment of the present invention.
Figure 2:
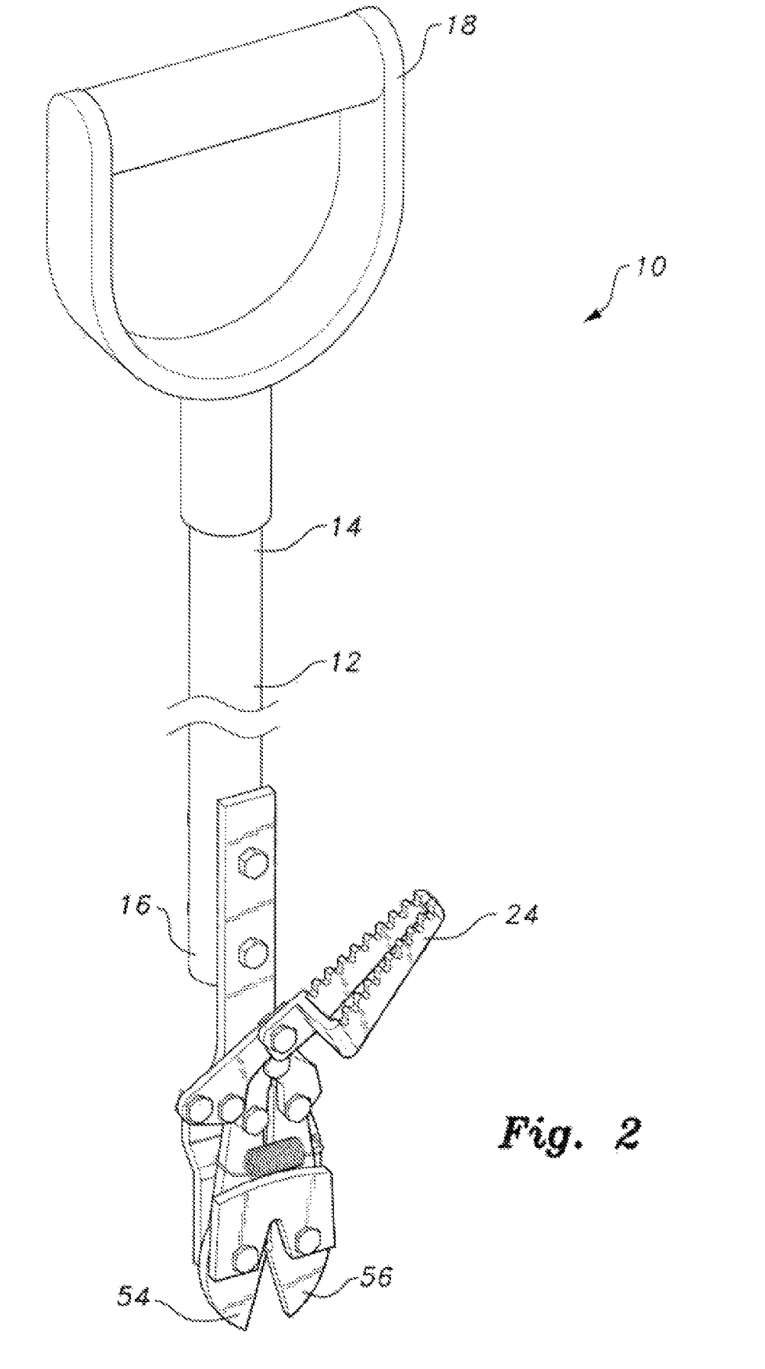
FIG. 2 is a perspective view of the cutter of FIG. 1.
Figure 3:
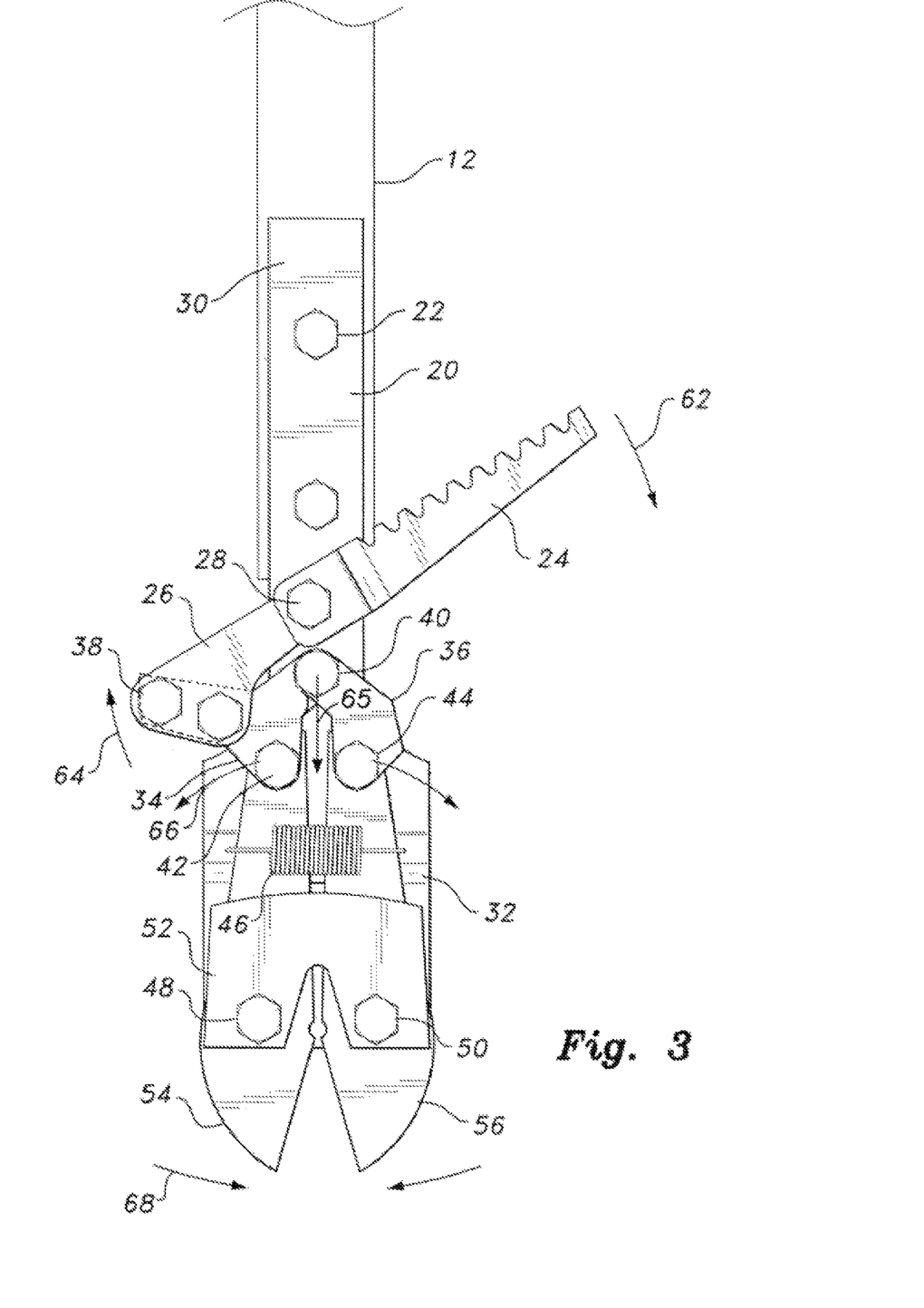
FIG. 3 is a partial front view of the cutter of FIG. 1, showing a detail view of the lower end of the cutter.
Figure 4:
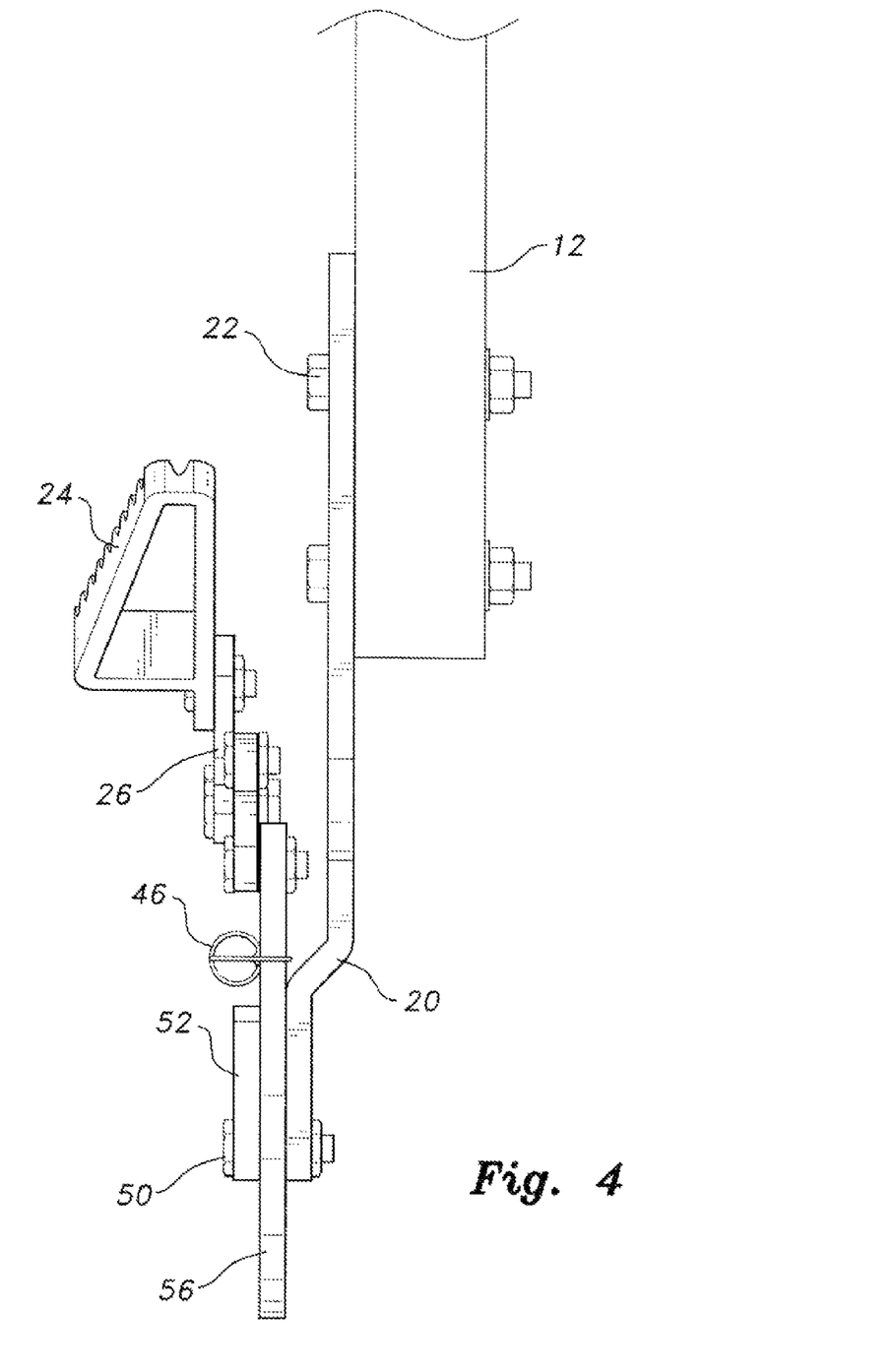
FIG. 4 is a side view of the cutter of FIG. 1, showing a detail view of the lower end of the cutter.

As best shown in FIGS. 3 and 4, an upper end 30 of a support member 20 is attached to the lower end 16 of the elongated handle 12 by a bolt 22 or the like, and extends downwardly therefrom. The support member 20 has opposed front and rear faces. The rear face preferably abuts the elongated handle 12, as shown best in FIG. 4.

A pair of cutting jaws 54, 56 are pivotally attached to a lower end 32 of the support member 20 by bolts 48, 50. It should be understood that cutting jaws 54, 56 are shown for exemplary purposes only and that the dimensions and configuration of cutting jaws 54, 56 may vary depending upon the nature of the article to be cut. First and second movement arms 34, 36, respectively, are pivotally coupled by bolts 42, 44 to the upper ends of the jaws 54, 56. The movement arms 34, 36 are also pivotally coupled to each other by bolt 40.

As seen best in FIG. 3, a foot operated lever 24 is attached to movement arm 34. In this embodiment, the lever 24 is coupled by a bolt 28 to an intermediate member 26 which is coupled to the arm 34 by one or more bolts 38. Further, as shown, an additional retaining member 52 having an inverted, substantially U-shaped or V-shaped notch defined therein, as shown, may be attached over the cutting jaws 54, 56, with the pivot bolts 48, 50 passing through the retaining member 52 on opposite side of the notch, through the cutting jaws 54, 56, respectively, and through the lower end 32 of support member 20. The plate 52 secures the jaws against spreading apart from each other while cutting. The notch allows a better view of the jaws by the user so that the user can see the location of the jaws prior to cutting.

From the foregoing, those skilled in the art will appreciate that selective rotation of the lever 24 (indicated by directional arrow 62 in FIG. 3) generated by downward pressure from the user's foot causes the movement arm 34 to rotate about pivot bolts 40 and 42 which causes movement of those bolts in the directions of arrows 65 and 66 respectively with the free end of the arm 34 moving in the direction of arrow 64. This results in movement of the upper ends of the jaws 54, 56 in the direction of arrows 66 causing rotation of the jaws about pivot bolts 48, 50 in the direction of arrows 68.

Further, as shown, a bias member 46 having opposed first and second ends is provided. The bias member 46 may be a helical tension or extension spring or the like, as shown. Each of the first and second ends of the bias member 46 are attached to a respective upper portion of one of the cutting jaws 54, 56, returning the cutting jaws 54, 56 to an open position when pressure is released from foot pedal lever 24. The bias member 46 also therefore biases the lever 24 to an upward position. The bias member 46 may be attached to cutting jaws 54, 56 in any suitable manner.

Figure 5:
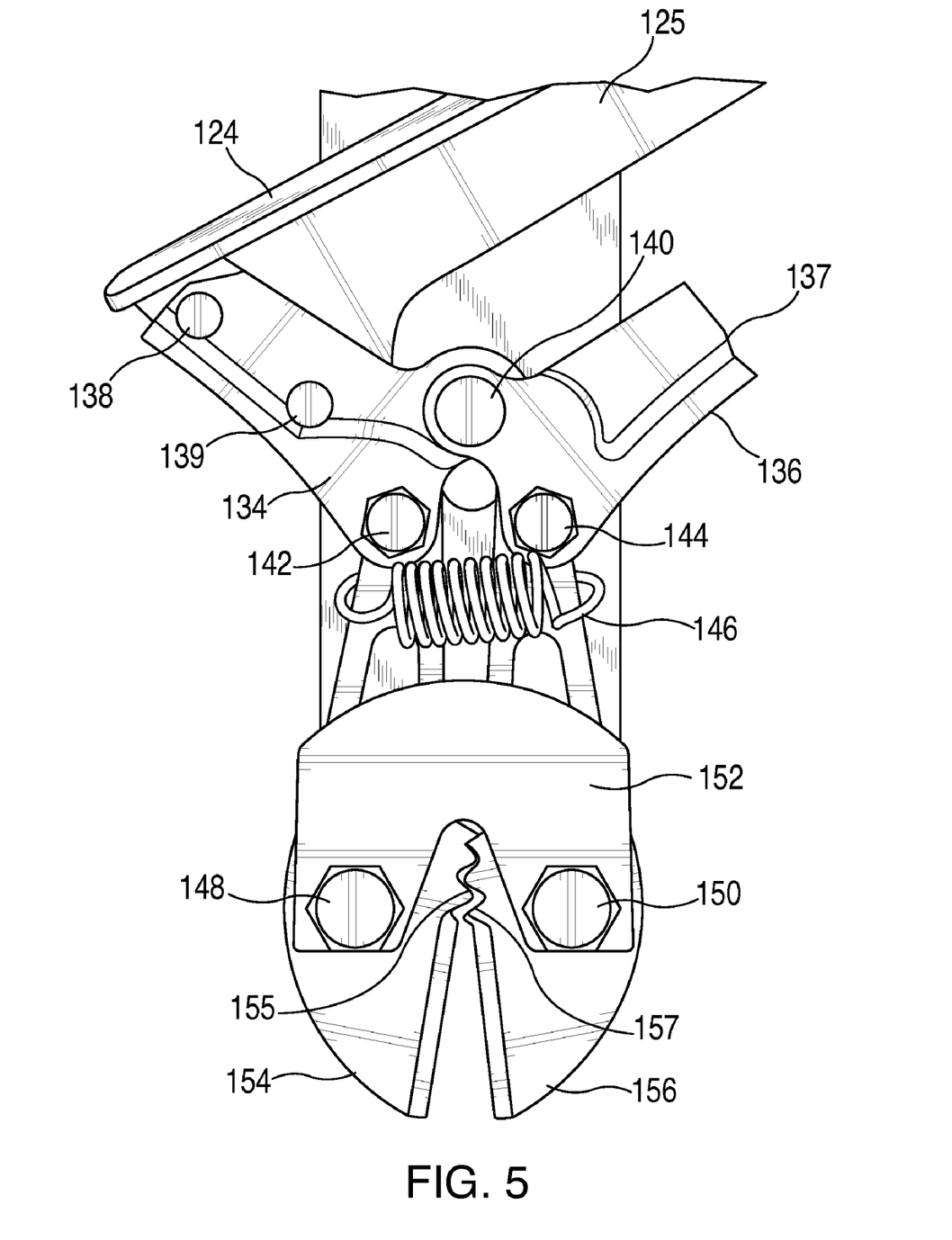
FIG. 5 is a view similar to FIG. 3 showing a second embodiment of the invention with the jaws open.
Figure 6:
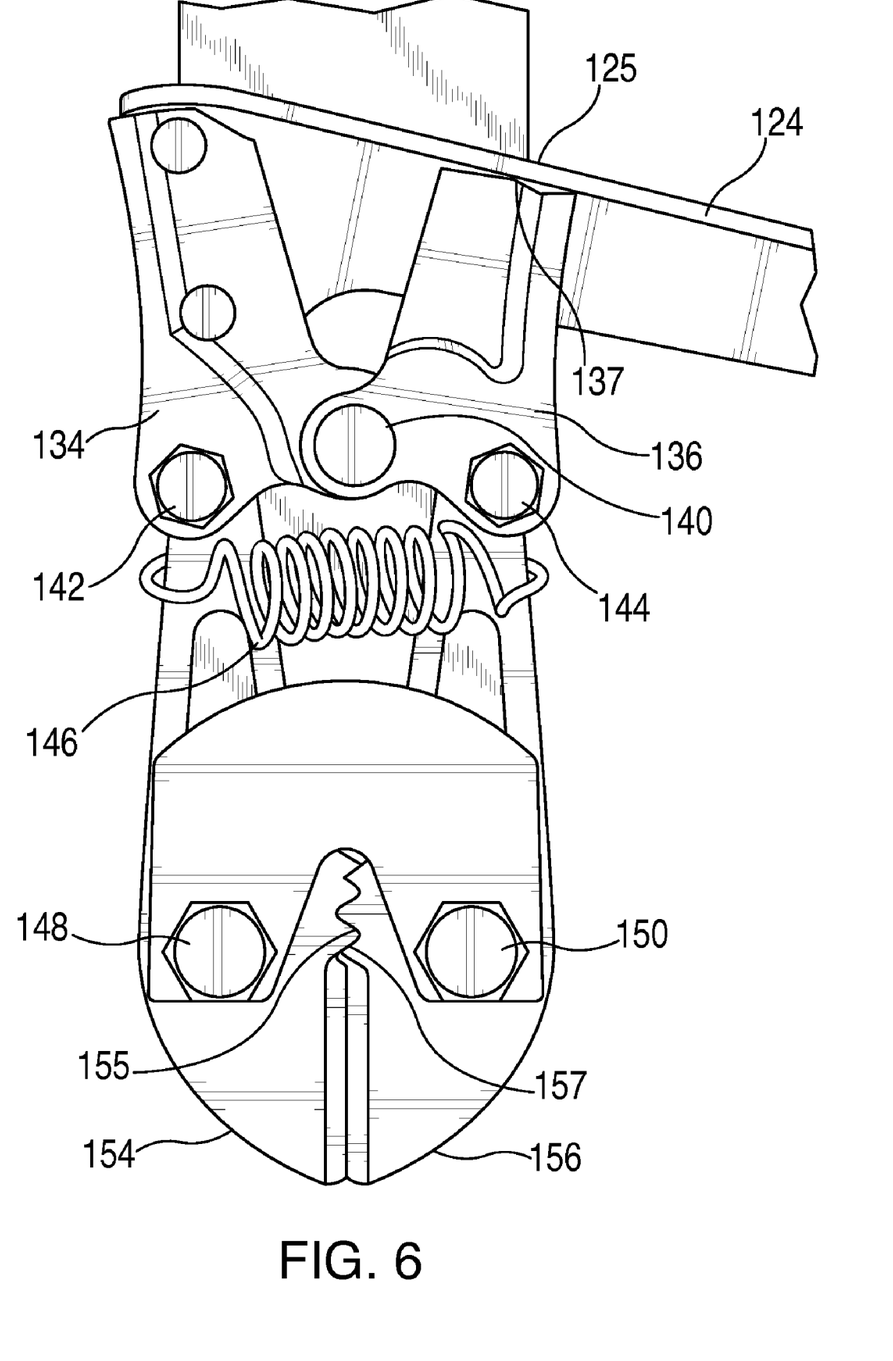
FIG. 6 is a view similar to FIG. 5 with the jaws closed.

Turning now to FIGS. 5 and 6, a second embodiment of the invention is shown with similar reference numerals (increased by 100) referring to similar parts. In this embodiment, the lever 124 is formed as a single integral piece which is attached to movement arm 134 by bolts or rivets 138, 139. The lever 124 is formed from an angle iron or the like thereby defining what will be a stopping surface 125. Movement arm 134 is pivotally coupled to the jaw 154 by bolt 142 and is pivotally coupled to the movement arm 136 by the bolt 140. Movement arm 136 is pivotally coupled to the jaw 156 by bolt 144 and has a free end 137 which will act as a stop. The jaws are pivotally arranged about pivot bolts 148, 150 respectively and are covered by member 152. In this embodiment, the jaws are provided with engaging teeth 155, 157 radially arranged relative to the pivot points 148, 150. The teeth help stabilize and strengthen movement of the jaws. A coil spring 146 is coupled to upper portions of the jaws between the pivot points 148, 150 on the one hand and the pivot points 142, 144 on the other hand.

When the lever 124 is fully actuated, the components assume the positions shown in FIG. 6. Here, the movement arms 134 and 136 have moved closer together pushing the upper ends of the jaws apart against action of the spring 146. The free end 137 of the arm 136 has moved into position under the stopping surface 125 of the lever 124 and the teeth 155, 157 have rotated into full engagement.

Figures 7, 8:
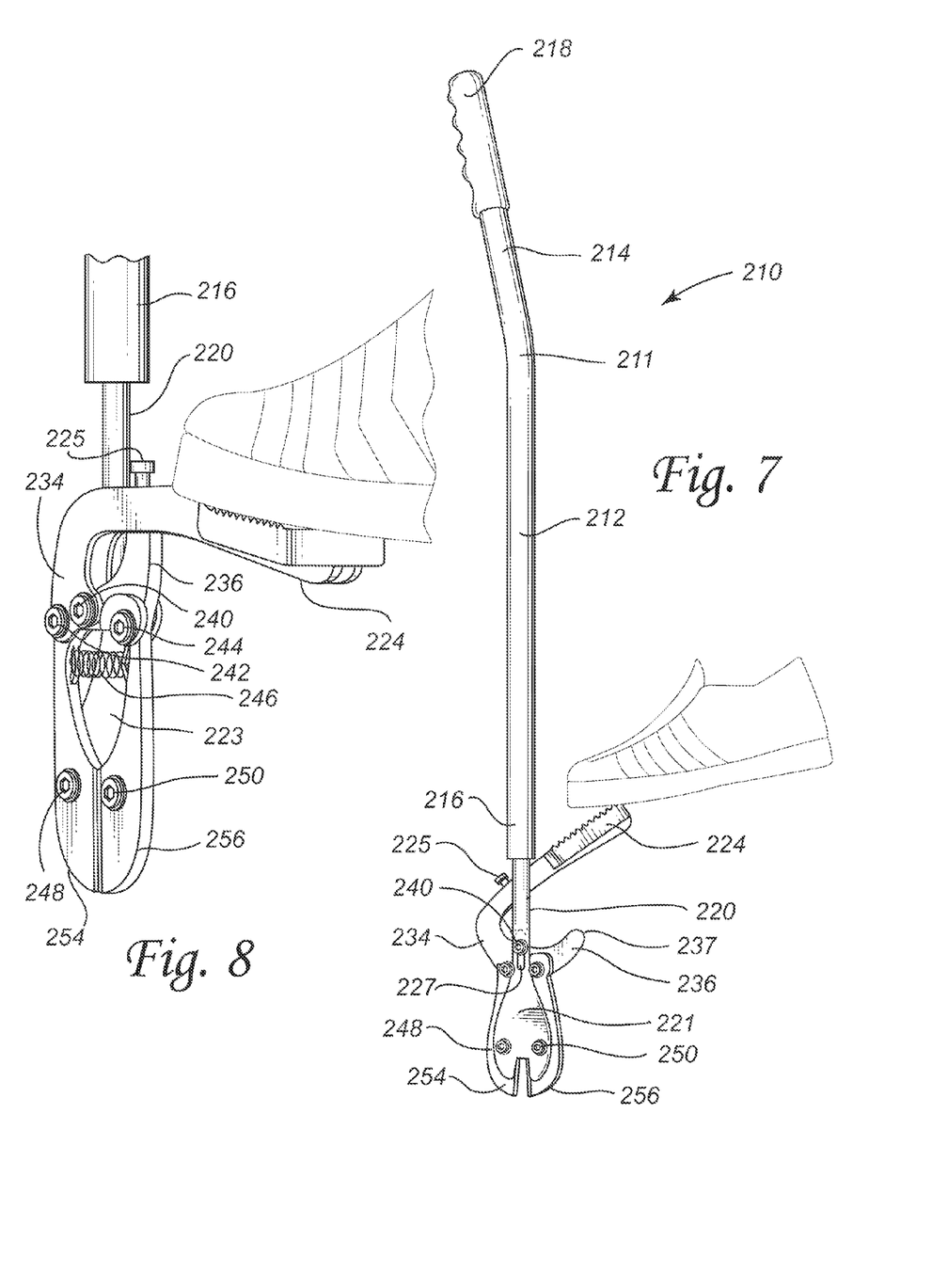
FIG. 7 is a perspective view of the third and presently preferred embodiment with the jaws open.
FIG. 8 is a broken perspective and partially cut-away view of the third embodiment with the jaws closed.

FIGS. 7 and 8 illustrate a third embodiment of the invention with similar reference numerals (increased by 200) referring to similar parts. In this embodiment, the support member 220 is forked having a pair of tines 221, 223 between which the jaws 254, 256, movement arms 234, 236, lever 224 and spring 246 are mounted. Also according to this embodiment, the lever 224 and the movement arm 234 are formed as a single integral member having an inverted U-shaped cross section as seen best in FIG. 8. The support member tines are also provided with slots 227 which receive the pivot bolt 240 and guide its up and down movement.

The movement arm 236 defines free end stop 237 which is received within the U-shaped cross section of the lever 224 when the jaws are closed as shown best in FIG. 8. The lever 224 is provided with an adjustable screw 225, the bottom end of which engages the stop 237 when the lever 224 is moved to the position shown in FIG. 8. The adjustable screw limits movement of the lever 224 and thus limits the movement of the jaws. When the jaws are open as shown in FIG. 7, the lower end 216 of the elongate member 212 may act as a stop for the lever 224. It can also be seen that in this embodiment that gripping member 218 is a joystick type grip and that it is angled forward away from the user via a bend 211 in the elongated handle 212. The forward angle may prevent rotation of the tool when in use. Some users may prefer the "D" handle of the first embodiment with or without the bend in the elongated handle.

There have been described and illustrated herein several embodiments of a foot operated cutter. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A foot operated cutter, comprising:
an elongated handle having opposed upper and lower ends;
a gripping member coupled to said upper end;
a support member extending from the lower end of the handle;
a pair of jaws pivotally mounted on the support member and movable from an open to a closed position;
a first movement arm pivotally coupled to one of said jaws;
a second movement arm pivotally coupled to the other of said jaws, said second movement arm also being pivotally coupled to said first movement arm;
a foot operable lever connected to said first movement arm, whereby movement of said lever causes rotational movement of said first movement arm relative to said one of said jaws and relative to said second movement arm thereby causing rotational movement of said second movement arm relative to said other of said jaws and causes said jaws to move from said open to said closed position; and
a biasing member coupled to said jaws and biasing them to the open position, wherein
said second movement arm has a free end defining a stop and said lever has a stopping surface which contacts said stop when said jaws are moved toward the closed position,
said stopping surface includes an adjustable set screw,
said supporting member is forked having a pair of spaced apart tines, said lever, said jaws, and said movement arms being mounted between said tines,
said tines define a pair of slots, said movement arms are coupled to each other by a pivot member which is arranged to ride in said slots.

2. A cutter according to claim 1, wherein:
said lever and said first movement arm are formed as a single integral piece.

3. A cutter according to claim 2, wherein:
said lever is formed from angle iron.

4. A cutter according to claim 2, wherein:
said lever and said first movement arm have a generally u-shaped cross section.

5. A cutter, comprising:
an elongated handle having opposed upper and lower ends;
a gripping member coupled to said upper end;
a support member extending from the lower end of the handle;
a pair of jaws pivotally mounted on the support member and movable from an open to a closed position;
a first movement arm pivotally coupled to one of said jaws;
a second movement arm pivotally coupled to the other of said jaws, said second movement arm also being pivotally coupled to said first movement arm;
a foot operable lever connected to said first movement arm, whereby movement of said lever causes rotational movement of said first movement arm relative to said one of said jaws and relative to said second movement arm thereby causing rotational movement of said second movement arm relative to said other of said jaws and causes said jaws to move from said open to said closed position, wherein
said supporting member is forked having a pair of spaced apart tines, each tine defining a plane, said lever, said jaws, and said movement arms being mounted between said planes, and
said tines define a pair of slots, said movement arms are coupled to each other by a pivot member which is arranged to ride in said slots.

6. A foot operated cutter, comprising:
an elongated handle having opposed upper and lower ends;
a gripping member coupled to said upper end;
a support member extending from the lower end of the handle;
a pair of jaws pivotally mounted on the support member and movable from an open to a closed position;
a first movement arm pivotally coupled to one of said jaws;
a second movement arm pivotally coupled to the other of said jaws, said second movement arm also being pivotally coupled to said first movement arm;
a foot operable lever connected to said first movement arm, whereby movement of said lever causes rotational movement of said first movement arm relative to said one of said jaws and relative to said second movement arm thereby causing rotational movement of said second movement arm relative to said other of said jaws and causes said jaws to move from said open to said closed position, wherein
said lever and said first movement arm have a generally u-shaped cross section.

7. A cutter according to claim 6, further comprising:
a biasing member coupled to said jaws and biasing them to the open position.

8. A cutter according to claim 6, wherein:
said second movement arm has a free end defining a stop and said lever has a stopping surface which contacts said stop when said jaws are moved toward the closed position.

9. A cutter according to claim 8, wherein:
said stopping surface is adjustable.

10. A cutter according to claim 9, wherein:
said stopping surface includes a set screw.

11. A cutter according to claim 6, wherein:
said lever and said first movement arm are formed as a single integral piece.

12. A cutter according to claim 6, wherein:
said lever is formed from angle iron.

13. A cutter according to claim 6, further comprising:
a notched plate covering said jaws, said jaws being mounted between said notched plate and said support member.

* * * * *